(12) United States Patent
Evans et al.

(10) Patent No.: US 12,299,380 B2
(45) Date of Patent: May 13, 2025

(54) INTELLIGENT DOCUMENT PROCESSING ASSISTANT

(71) Applicants: Merlyn Evans, Arlington, VA (US); Nicole Blohm, Mount Pleasant, SC (US)

(72) Inventors: Merlyn Evans, Arlington, VA (US); Nicole Blohm, Mount Pleasant, SC (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/117,957

(22) Filed: Mar. 6, 2023

(65) Prior Publication Data

US 2024/0303412 A1 Sep. 12, 2024

(51) Int. Cl.
*G06F 3/048* (2013.01)
*G06F 40/106* (2020.01)
*G06F 40/166* (2020.01)
*G06V 30/416* (2022.01)

(52) U.S. Cl.
CPC .......... *G06F 40/166* (2020.01); *G06F 40/106* (2020.01); *G06V 30/416* (2022.01)

(58) Field of Classification Search
CPC .... G06F 40/166; G06F 40/106; G06V 30/416
See application file for complete search history.

(56) References Cited

U.S. PATENT DOCUMENTS

| 9,430,453 | B1* | 8/2016 | Ho | G06F 40/226 |
|---|---|---|---|---|
| 2017/0105701 | A1* | 4/2017 | Pelissier | A61B 8/461 |
| 2018/0247024 | A1* | 8/2018 | Divine | G16H 40/20 |
| 2019/0171467 | A1* | 6/2019 | Hermosillo Valadez | G06T 7/0012 |
| 2019/0188301 | A1* | 6/2019 | Nohutcuoglu | G06F 40/186 |
| 2019/0236499 | A1* | 8/2019 | Reyes | G16H 40/20 |
| 2019/0286668 | A1* | 9/2019 | Puzicha | G06F 40/166 |
| 2020/0167413 | A1* | 5/2020 | Van Rotterdam | G06F 16/95 |
| 2020/0210746 | A1* | 7/2020 | Mesmakhosroshahi | G06V 30/413 |
| 2020/0250826 | A1* | 8/2020 | Cohen Maimon | G16H 30/20 |
| 2020/0272814 | A1* | 8/2020 | Balin | G06V 30/412 |
| 2021/0224885 | A1* | 7/2021 | Yarra | G06Q 30/0627 |
| 2022/0044798 | A1* | 2/2022 | Starobinets | G16H 40/67 |

(Continued)

FOREIGN PATENT DOCUMENTS

| EP | 4266265 A1 * | 10/2023 | G06V 10/82 |
|---|---|---|---|
| RU | 2739342 C1 * | 12/2020 | G06F 40/279 |

*Primary Examiner* — Rashawn N Tillery
(74) *Attorney, Agent, or Firm* — Hickman Becker Bingham Ledesma LLP

(57) ABSTRACT

Techniques for an intelligent document processing assistant are provided. In one technique, an electronic document is received and content thereof is automatically analyzed to determine a document type of the electronic document. Based on the document type, text data is extracted from the electronic document. The text data comprises multiple field values that correspond to multiple field names that are associated with the document type. Some of the field names and field values are presented on a screen of a computing device. In response to receiving, through the computing device, first user input that modifies at least one data item (in the text data that was extracted from the electronic document), the text data is updated to generate modified text data. Second user input that confirms the modified text data is received through the computing device. The modified text data is transmitted over a network to a data storage service.

20 Claims, 16 Drawing Sheets

(56) References Cited

U.S. PATENT DOCUMENTS

| | | | | |
|---|---|---|---|---|
| 2022/0318492 A1* | 10/2022 | Gohari | ............... | G06F 40/194 |
| 2022/0343358 A1* | 10/2022 | Kurtzner, III | ...... | G06Q 30/0231 |
| 2023/0273952 A1* | 8/2023 | Miyauchi | ............ | G06V 30/418 |
| | | | | 382/190 |
| 2023/0334885 A1* | 10/2023 | Krishnamurthy | .... | G06V 30/148 |

* cited by examiner

FIG. 3B

INTELLIGENT DOCUMENT PROCESSING ASSISTANT

TECHNICAL FIELD

This present disclosure relates to training an electronic document processor and, more particularly, to intelligently assisting a user during the training process.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Intelligent document processing (IDP) is a mature software category that automates manual document handling tasks, such as data extraction and data entry. IDP is used by many enterprise customers with centralized operations. However, IDP has not reached widespread adoption largely due to requiring significant capital expenditure. The capital expenditure barrier has been removed by transaction-based cloud services, such as Ricoh IBP, but widespread adoption is still hampered by the need to provide skilled IT resources to operate machine learning modules. Furthermore, data entry in current computer systems is confusing and intimidating to the average human user. As a result, only a few skilled individuals in a company are able to perform these tasks.

SUMMARY

The appended claims may serve as a summary. In one aspect, an apparatus is provided. The apparatus comprises a memory storing instructions which, when executed by one or more processors, cause content of an electronic document to be automatically analyzed to determine a particular document type of the electronic document from among a plurality of document types. Based on the particular document type, text data is extracted from the electronic document, where the text data comprises a plurality of field values that correspond to a plurality of field names that are associated with the particular document type. At least a portion of the plurality of field names and the plurality of field values is presented on a screen of a computing device. First user input that modifies at least one data item (in the text data that was extracted from the electronic document) is received through the computing device. In response to receiving the first user input, the text data is updated to generate modified text data. Second user input that confirms the modified text data is received through the computing device. The modified text data is transmitted over a computer network to a target data storage service.

The aforementioned approaches may also be implemented by one or more computer-implemented processes and non-transitory computer-readable media that store instructions which, when processed by one or more processors, implement the approach.

BRIEF DESCRIPTION OF THE DRAWINGS

In the figures of the accompanying drawings like reference numerals refer to similar elements.

FIG. 3A-3C are screenshots of user interfaces that allow an end-user to assist in training an IDP system, in an embodiment;

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections.

I. OVERVIEW
    II. SYSTEM OVER VIEW
    III. IDP SYSTEM
        A. DOCUMENT TYPES
        B. DOCUMENT TYPES ASSOCIATED WITH AN ORGANIZATION
        C. DOCUMENT TYPE MATCHING PROCESS
    IV. EXTRACTION INITIATION
        A. MULTIPLE PAGES
        B. MULTIPLE DOCUMENTS IN A FILE
        C. FIELD NAME-TO-VALUE MATCHING
        D. USER INTERFACE FOR DISPLAYING EXTRACTED DATA
        E. WARNINGS
        F. TARGET DATA STORAGE SERVICE
        G. DOCUMENT DATA
        H. PROCESS COMPLETION
    V. USER-ASSISTED EXTRACTION
    VI. EXAMPLE PROCESS
    VII. IMPLEMENTATION MECHANISMS

I. Overview

An approach is provided for a user-friendly, accessible, and guided machine learning extraction system that integrates data from any source to any target data system. The traditional IDP is flipped; instead of selecting a document type and running a batch of documents through the extraction system, embodiments involve running a batch of documents through the data processing and extraction system and determining the document type for each document, after which extracted data is delivered to a target data system. By enabling a simple user interface that guides a user through the whole process, end users are able to train the system on document types, index fields, etc., sending that data to an online service in order to improve determination and prediction of document types and index fields. This helps end users be more efficient and provides accessibility to users of all skill levels in order to capture important enterprise information.

II. System Overview

Figure 1:
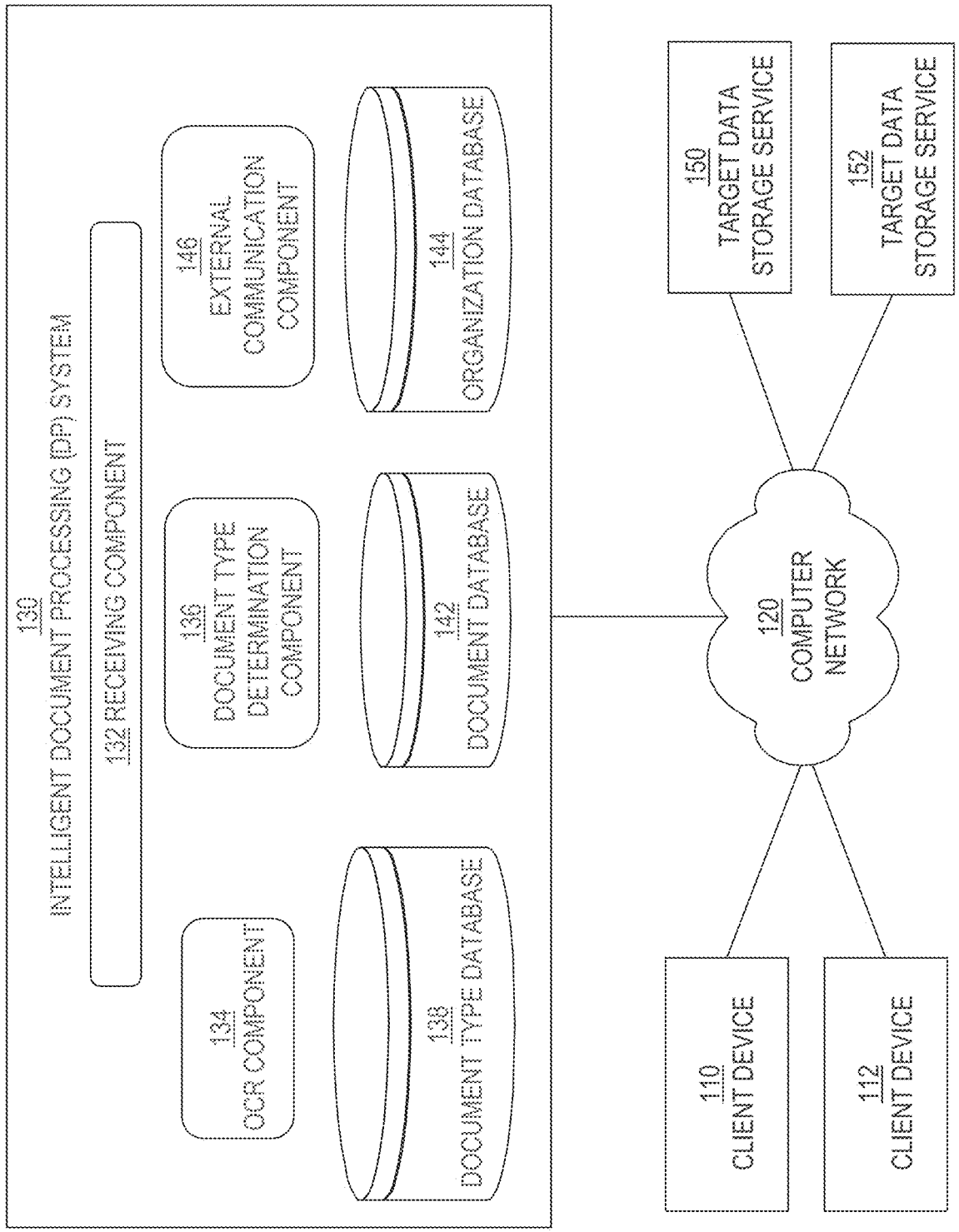
FIG. 1 is a block diagram that depicts an example system for intelligent document processing, in an embodiment.

FIG. 1 is a block diagram that depicts an example system 100 for IDP, in an embodiment. System 100 includes client devices 110-112, a computer network 120, a IDP system 130, and target data storage services 150-152. Although only two client devices are depicted, system 100 may include many client devices. Similarly, although only two target data storage services are depicted, system 100 may include more or less target data storage services.

Examples of client devices 110-112 include a smartphone, a laptop computer, a desktop computer, a tablet computer, and a multi-function peripheral (MFP). Each of client devices 110-112 hosts an application that communicates with IDP system 130 over computer network 120. The application (developed by the same entity that owns or operates IDP system 130) may be a native application that is installed on the client device or may be a web application that executes within a web browser that is installed on the client device.

Client devices 110-112 may be from the same enterprise or organization or from different enterprises or organizations. Client devices 110-112 transmit electronic documents to IDP system 130. An electronic document may be: (a) an image generated by (i) a camera integrated into a client device (e.g., a smartphone) or (ii) a scanning device that is part of an MFP; (b) a PDF that may have been included in an email from a third-party that generated the electronic document; (c) a word processing document; or (d) an email. Client devices 110-112 may upload, to IDP system 130, in a single data transfer, a single electronic document (e.g., an image of a physical document) or multiple electronic documents of the same type or of different types. A single electronic document may comprise multiple pages.

III. IDP System

IDP system 130 comprises a receiving component 132, an optical character recognition (OCR) component 134, a document type determination component (DTDC) 136, a document type database 138, an AI chatbot 140, a document database 142, an organization database 144, and an external communication component (ECC) 146. Each of these components may be implemented in software, hardware, or any combination of software and hardware. The following description of these components is for ease in explanation of embodiments. These components (or a subset thereof) may be implemented in the same program or process. Alternative the tasks performed by the same component (as described herein) may be performed by different components.

While embodiments described herein involve IDP system 130 (or components thereof) performing certain operations or tasks, embodiments are not so limited. For example, some of those operations or tasks may be performed by applications hosted on client devices 110-112, which applications are configured to communicate with IDP system 130 over computer network 120 and present data (received from IDP system 130) on screens of client devices 110-112. Thus, instead of the applications on client devices 110-112 being "dumb" by just display data that IDP system 130 provides, the applications may perform substantive tasks, such as an OCR operation, storing (at least temporarily) all possible field names of a document type (received from IDP system 130), performing comparisons between those field names with extracted text data items, generating confidence scores, identifying low confidence field names/values, etc.

Receiving component 132 receives an electronic document and processes the electronic document. If text data has not already been extracted from an electronic document, then "processing" the electronic document involves OCR component 134 performing an OCR operation on the electronic document. Output from an OCR operation comprises extracted text and, optionally, spatial information.

Spatial information indicates where in the electronic document each extracted text data item (i.e., a character or series of continuous characters) is located in the electronic document. Spatial information may comprise one or more byte offsets (or a range of byte offsets) and/or one or more pixel offsets (or two ranges of pixel offsets; one in the horizontal direction and one in the vertical direction). Thus, each extracted text data item may be associated with distinct spatial information. Additionally or alternatively, spatial information for an extracted text data item may include logical spatial data that indicates where the extracted text data item is located relative to one or more other extracted text data items, particularly ones that are relatively close to each other. Such logical spatial data may indicate that one extracted text data item is above or "up" relative to another extracted text data item, or that one extracted text data item is to the left of another extracted text data item.

A. Document Types

Document type database 138 stores data about multiple document types. A document belongs to one document type. Example document types include invoice, W-2, EOB (explanation of benefits), driver's license, and purchase order. A description of a document type may be represented in a record (e.g., row, object, or other data structure) in document type database 138.

Each record indicates a set of field names of the corresponding document type. Example field names include first name, last name, mailing address, phone number, email address, social security number, date of birth, invoice number, and policy number. Each record may also indicate, for one or more of the field names of the document type, a data type value (e.g., NUMBER, DATE, STRING), an expected spatial location (that indicates where the field name and/or corresponding field value is located in a document of the document type), and/or logical spatial data that indicates where the field name and/or corresponding field value is located, in a document of the document type, relative to one or more other field names/values). The set of field names for a document type is referred to as a "data set."

DTDC 136 determines a document type of an electronic document. This determination may be made by (1) analyzing (i) characteristics of the extracted text (e.g., a set of extracted text items) and, optionally, (ii) spatial information of the extracted data items and (2) comparing those characteristics with characteristics of known document types. For example, the extracted text may include multiple text data items that match multiple (or most) fields names that are associated with a document type. As another example, the spatial information of the extracted data items may match the spatial information of field names associated with a document type. A result of the comparison may be a categorical match score, such as "no match," "full match," or "partial match." Instead of such match categories, a numerical match score may be calculated, such as a percentage match. For example, a 90% match indicates that 90% of field names of a document type match extracted text data items from the electronic document. A match score may be based on field name matches and/or spatial information matching. The higher the match score pertaining to a document type, the more likely that the electronic document is of the document type.

B. Document Types Associated With an Organization

If IDP system 130 supports document processing of electronic documents from multiple organizations, then DTDC 136 may determine an organization that is associated with a received electronic document. The identity of the organization may be associated with document types in which the organization is interested. A determination of document types of an organization may be stored in document type database 138 and/or organization database 144.

Organization database 144 stores data about multiple organizations, such as document type data that identifies a set of document types that are used by a corresponding organization, document identification data that identifies a set of documents that have been processed for the corresponding organization, member identification data that identifies members of the corresponding organization, and connector data that identifies a set of connectors (or target data storage services) that are used by the corresponding organization to store extracted data items that originate from processed electronic documents. The target data storage services may be third-party data storage services, third-party relative to the entity that owns or manages IDP system 130 and the entity with which the user is affiliated/employed.

Thus, when processing an electronic document, DTDC 136 may determine an organization that is associated with the electronic document, then look up, in organization database 144, document types that are associated with the organization. Determination of an organization may involve determining (i) an identity of a computing device (e.g., client device 110) that provided the electronic document or (ii) an identity of a user of the computing device. The identity may be associated with the organization in member identification data in organization database 144.

In an embodiment, one or more document types of an organization may be associated with access privileges. Example privileges include initiating the processing of documents associated with a document type, modify a document type, deleting a document type, and creating a new document type. Thus, some users of an organization may have one or more of these privileges while other users of the organization do not.

In an embodiment, IDP system 130 stores member training data (e.g., in document type database 138) that identifies one or more members of an organization that have contributed to training IDP system 130 for a document type. Thus, different document types may be associated with a different set of members. One of the members may have merely modified one field name, deleted one field name, or added one field name. Member training data of a document type may indicate when the document type was created, who created the document type, what modifications (if any) have been made to the document type, and who initiated those modifications (if any). If a document type was deleted with respect to an organization, then member training data may indicate when that deletion occurred and who initiated the deletion. Such member training data may only be accessible to certain users in an organization, such as users with a manager status.

In an embodiment, IDP system 130 stores member uploading data (e.g., in document type database 138) that identifies, for each document type, one or more members (or users of an organization) that are uploading documents of that document type. Thus, member uploading data may be updated whenever extracted data points of a document have been successfully transmitted to a target data storage service. Member uploading data may indicate, for each document of the corresponding document type, when the document was processed, which target data storage services was used, and who initiated the processing of the document. Again, such member uploading data may only be accessible to certain users in an organization, such as users with a manager status.

In an embodiment, IDP system 130 stores, for each document type of an organization, data that associates the document type with documents of that document type that have been processed, which documents may be associated with identities of the users who initiated the processing of those documents. Thus, a user of the organization may select a document type and then select an option to view the users (of an organization) who have been initiating the processing of documents of that document type. This data is helpful for managers of the organization to see who has been doing the work on a per-document type basis. Also, a user of the organization may select a thumbnail option associated with a document type, which selection causes a view to be presented, the view including thumbnails of documents, of the selected document type, that have been processed. Then, selection of a thumbnail causes an image of the electronic document to be presented on a screen of a computing device of the user.

C. Document Type Matching Process

Given a set of document types that are associated with the identified organization, DTDC 136 may perform, for each document type in the set, a comparison between characteristics of the extracted text data items and characteristics of the document type. The comparisons may stop when a match score of 100% or "full match" is calculated/determined for a document type, so that comparisons with respect to other document types do not need to be made.

In the embodiment where a document type search is limited to document types of an organization associated with the received electronic document, it may be possible that no match is found. For example, the highest match score in a set of document types may be 60% and a threshold match score may be 75%. Since the highest match score is less than the threshold match score, then DTDC 136 determines that there is no document type match. In such a scenario, DTDC 136 determines that the electronic document is associated with a new document type, or one that is not associated with the organization. This scenario may trigger searching document types associated with (or used by) other organizations. Thus, DTDC 136 may compare characteristics of the extracted text data items and/or associated spatial information with document types of other organizations. Searching document types of other organizations is referred to as "federated searching," which allows documents of document types that have never been provided by a user or organization to be processed without any additional training from the user or organization. Thus, the training IDP system 130 once for a document type by one user or organization may be leveraged by many other users or organizations. For example, a user at organization A provides a W2 form and provides, to IDP system 130, instructions to extract four specific fields. Later, users at organizations B, C, and D do the same in providing, to IDP system 130, W2 forms and instructions to extract the four specific fields. Then, when IDP system 130 receives a W2 form from a user at organization E, IDP system 130 suggests the four fields as recommended fields to extract.

IV. Extraction Initiation

Figure 2A:
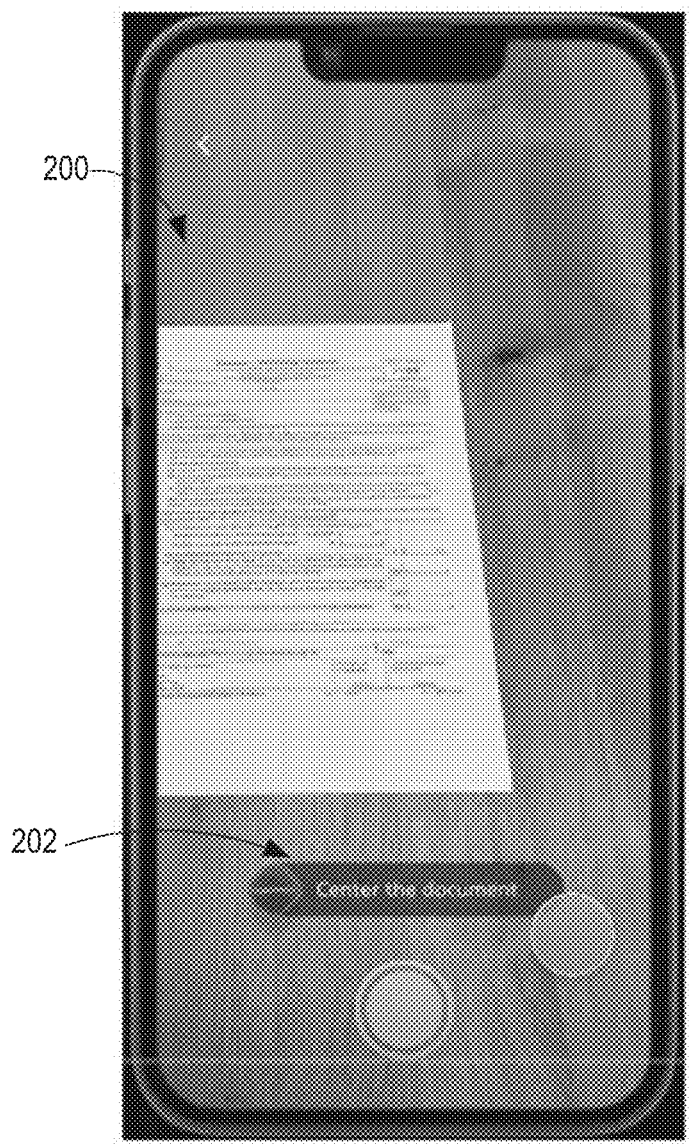
FIG. 2A-2J are screenshots of different user interfaces that are presented on a screen of a computing device to assist in document processing, in an embodiment.
Figure 2B:
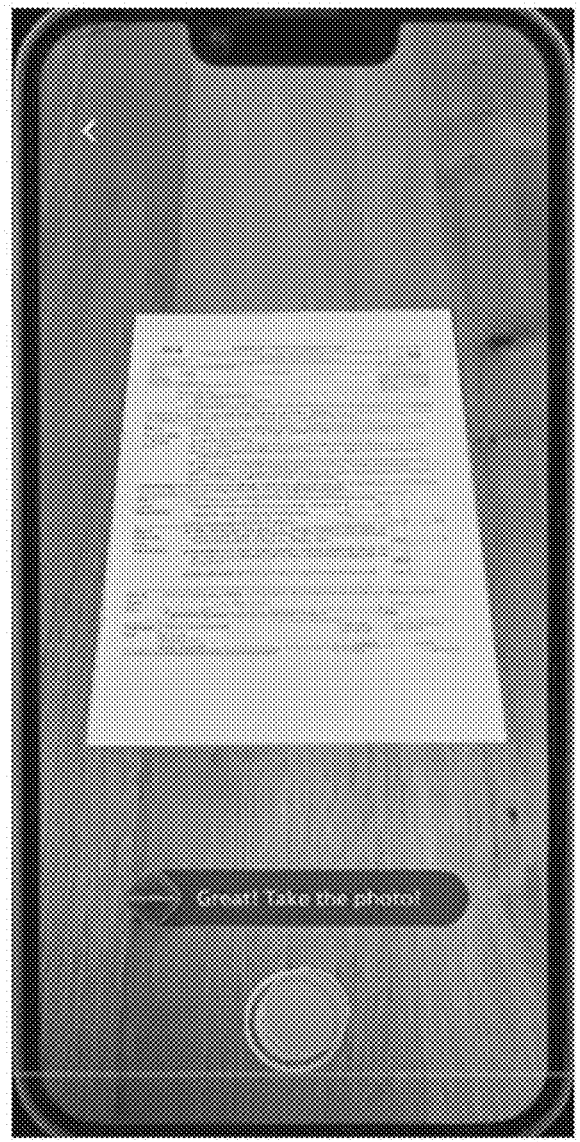

Initiation of processing of an electronic document may occur in one of multiple ways. Initiation may involve a user of client device 110 selecting, for uploading to IDP system 130, an electronic file (i) that is stored on client device 110 (e.g., in a photo library or in a file folder) (or an external storage system to which client device 110 is connected, such as a proprietary document storage cloud service or a third-party document storage cloud service) and (ii) that contains the document. Initiation may also involve pointing a view of a camera on client device 110 toward a physical document and selecting a graphical button to take a picture of the physical document and then causing the picture (or digital image) to be uploaded to IDP system 130. FIG. 2A is a screenshot of an example view 200 of the latter example where a camera is used to take a picture. View 200 includes a prompt 202 that invites the user to center a physical document in a camera view of the physical document. The user moves the camera until the physical document is near the center of the camera view, as depicted in FIG. 2B.

Figure 2C:
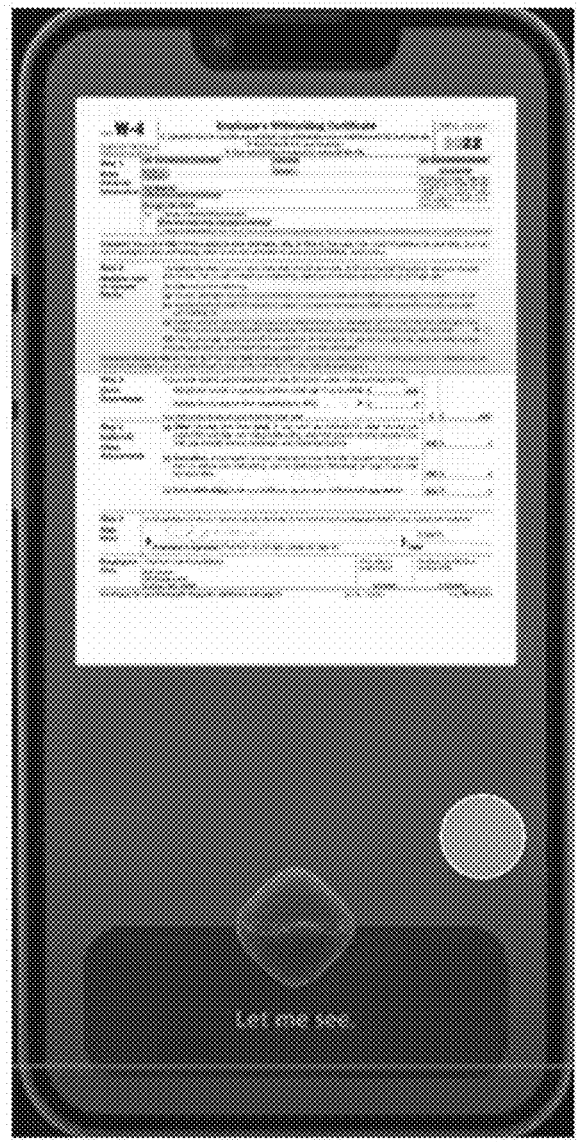

In this example, the camera is not positioned directly above the physical document, but at an angle. However, upon transmission of the digital image of the physical document from client device 110 over computer network 120 to IDP system 130, IDP system 130 applies one or more transformations to rotate the electronic document so that when the electronic document is re-displayed on the screen of client device 110, the top and bottom of the electronic document are equal (or near equal) in length and the sides of the electronic document are parallel with the sides of the screen of client device 110. A result of this transformation of the electronic document is presented in FIG. 2C, which indicates (with the "Let's me see" text and the highlighted text at the top of the document) that IDP system 130 is scanning the electronic document.

Figure 2D:
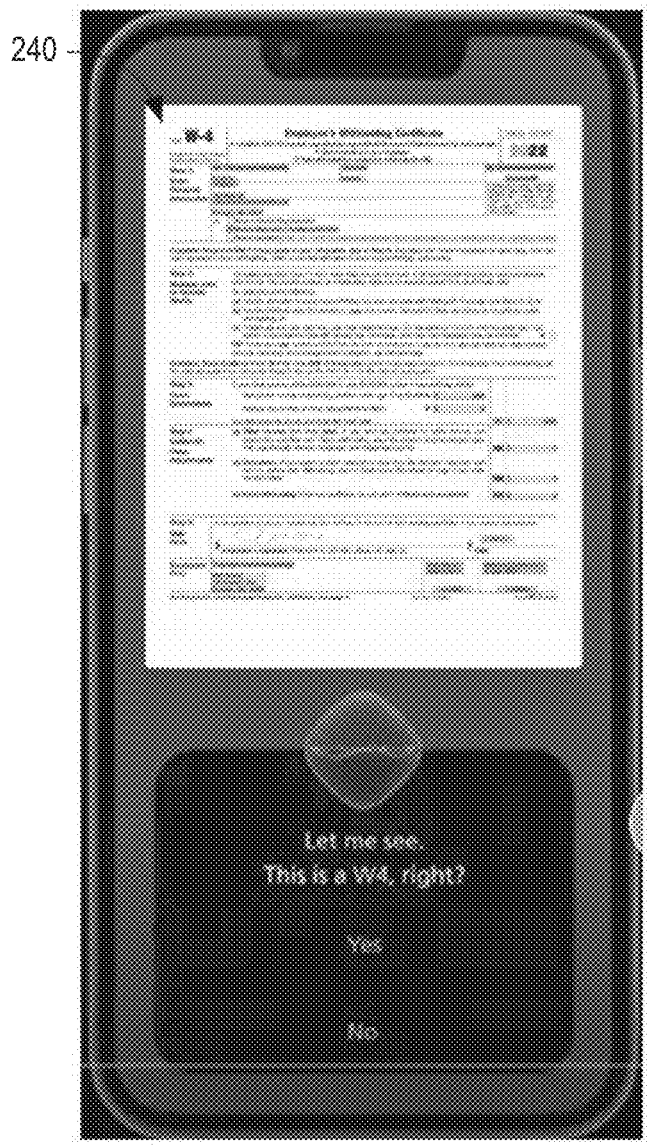
Figure 2E:
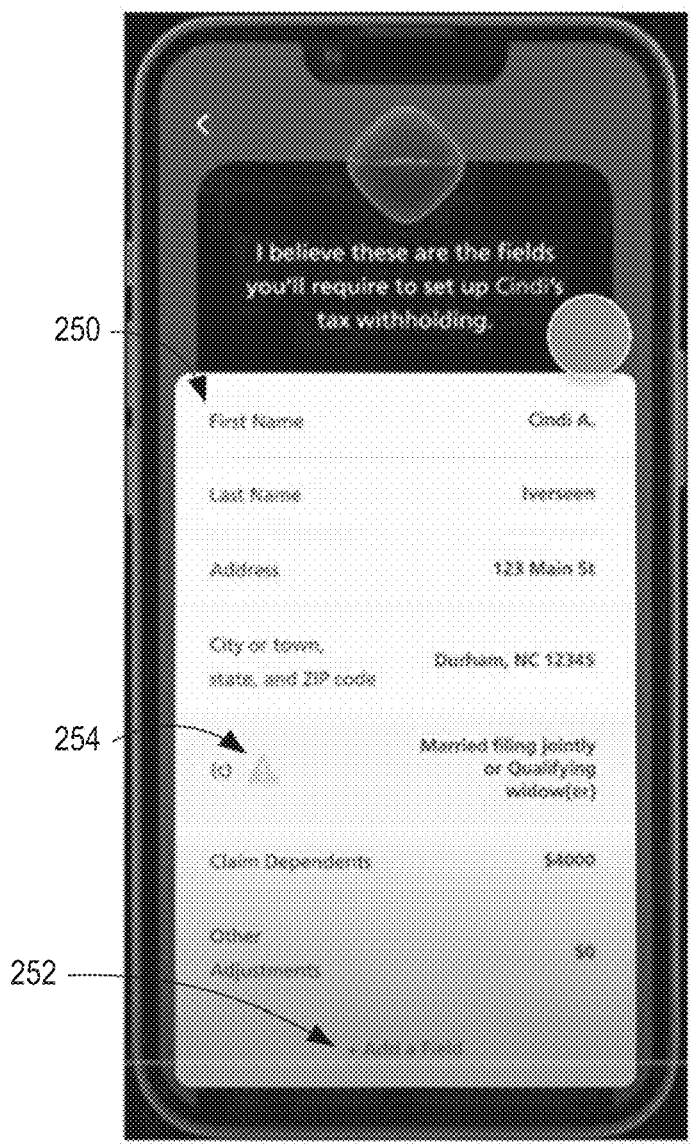

FIG. 2D is a screenshot of a user interface 240 that includes an identification of the document type of the electronic document ("This is a W4, right?") and prompts the user of client device 110 to confirm (with yes and no options below the document type identification) whether the document type identification is correct.

In an embodiment, instead of a fixed, linear process for interacting with users of client devices 110-112, artificial intelligence (AI) chatbot 140 generates the messages and content that is displayed in the user interfaces of FIGS. 2C through 3C, which represent examples of questions and content IDP system 130 may present to users of client devices 110-112. Embodiments are not limited to this order of content and questions, or even these specific questions. Instead, AI chatbot 140 generates questions based on a machine-learned model that is trained on past interactions with users of computing devices that have uploaded documents to IDP system 130. Each AI chatbot 140 question and content that is presented to a user may take into account what was previously sent to the user. Thus, each AI chatbot 140 interaction may be contextual.

Each training instance that is used to train the machine-learned model may indicate which questions were displayed to the user, whether the user ceased interacting with IDP system 130 (e.g., before completing a data extraction or a data transmission), a length of time of the interaction between the user and IDP system 130, an indication of a successful data extraction and transmission, whether positive feedback from the user was provided, etc. Thus, AI chatbot 140 may ask different questions of different users and, even if some of the same questions are used for different users, AI chatbot 140 may ask those questions in a different order for different users.

A. Multiple Pages

DTDC 136 (or another component) determines whether a file (e.g., a PDF or image) from a computing device includes multiple pages. This determination may involve: (a) examining metadata associated with the file, which may indicate a number of pages; (b) analyzing the file to identify page break data; (c) examining output from the OCR operation to detect references to page numbers or common text and spacing patterns that indicate an end of page or new page; and/or (d) examining output from the OCR operation to detect a common identifier with certain characteristics on multiple pages.

B. Multiple Documents in a File

If multiple pages are detected, then DTDC 136 determines whether the pages belong to the same electronic document or to different electronic documents. (Thus, a single file may include multiple electronic documents.) Such a determination may involve determining that page numbering ends or restarts and/or determining that a common identifier (e.g., a policy number or invoice number) for a previous set of pages is not found in a subsequent page. Thus, DTDC 136 may determine that a file contains multiple documents of the same type or of different types.

In an embodiment where IDP system 130 detects multiple documents (whether of the same type or different types) in a single file, IDP system 130 presents a first option to immediately process the first document and a second option to allow the user to review the document type classification of one or more of the multiple documents. For example, user selection of the first option causes user interfaces similar to those in FIGS. 2C-2D to be presented on a screen of the user's computing device.

On the other hand, user selection of the second option causes a list of names/identifiers of the detected documents and their corresponding detected document types to be presented on a screen of the computing device. In addition to, or instead of, a name/identifier of a detected document, the list may include a thumbnail image of the first page of each detected document. Then, user selection of the name/identifier or thumbnail image of one of the detected documents causes a fuller view (e.g., full screen view) of the first page of the selected document may be presented on the screen. Then the user may provide input (e.g., finger swipes or audio instructions) to zoom in on the presented page and/or cause a subsequent page of the selected document to be presented on the screen. Then the user may provide one or more inputs to confirm whether the document type classification of the selected document is correct, similar to user interface 240 in FIG. 2D.

C. Field Name-to-Value Matching

If a matching document type is found for an electronic document, then DTDC 136 may use the matched document type to: (1) identify extracted text data items that pertain to field values, (2) identify extracted text data items that pertain to field names, and then (3) associate (i) the extracted text data items pertaining to field values with (ii) the extracted text data items pertaining to field names. The extracted text data items and the association between field values and field names are stored in association with the electronic document. This association is used to present at least a portion (or subset) of the extracted text data items on a screen of a computing device (e.g., client device 110).

The field values that have been extracted from an electronic document and correspond to the set of field names (or "data set") of the corresponding document type are referred to as "data points." Thus, once processed by IDP system 130, an electronic document is associated with a data set (as a result of the electronic document being of the corresponding document type) and data points for that data set.

In an embodiment where a new document type is discovered for a user or for an organization of the user, but the document type is "old," or has been detected before for another user or for another organization (and, thus, is known to IDP system 130), IDP system 130 may determine a "suggested data set" for the "new" document type and present the suggested data set in a user interface on a screen of the computing device of the user. A suggested data set is a data set that IDP system 130 predicts might be relevant to the user. For example, the suggested data set may be a data set that was used by another organization for the corresponding document type. This option may be used if only one other organization has processed documents pertaining to this document type. As another example, the suggested data set may be a data set that represents the intersection of multiple data sets, each pertaining to a different organization that are associated with the document type. This option may be used if multiple organizations have processed documents pertaining to this document type.

On the other hand, a custom data set is one that has been selected by a user. A portion of the custom data set may have corresponded to a suggested data set. For example, if a user is presented, in a user interface, a suggested data set and the user selects one of the field names in the suggested data set for deletion because the user (or the associated organization) is not interested in that field name, then the reduced suggested data set becomes a custom data set for the user or organization. As another example, if a user is presented, in a user interface, a suggested data set and the user, using the user interface and options found thereon for viewing additional field names extracted from the electronic document, selects one of the additional field names for insertion into the suggested data set, then the expanded suggested data set becomes a custom data set for the user or organization.

In an embodiment, IDP system 130 stores document type data (e.g., in document database 142) that associates documents with their corresponding document type. In this way, IDP system 130 may determine a number of documents of each document type that have been processed, which may be useful for analytics purposes.

D. User Interface for Displaying Extracted Data

FIG. 2E-I are screenshots of example user interfaces 250-270 for confirming an automatic data extraction of an electronic document, in an embodiment. Like the user interfaces of FIGS. 2A-2D, user interfaces 250-270 are presented on a screen of a computing device, such as client device 110. While the computing device in the depicted example is a smartphone, embodiments are not so limited. For example, the computing device may be a desktop computer. Thus, instead of the user of the computing device making selections with his/her finger, the user may make selections with a cursor control device, such as a mouse.

User interface 250 includes seven field names on the left side (i.e., "First Name," "Last Name," "Address," "City or town, state, and Zip code," "(c)," "Claim Dependents," and "Other Adjustments." User interface 250 also includes seven field values on the right side (i.e., "Cindi A.," "Iverseen," "132 Main St," "Durham, NC 12345," "Married filing jointly or Qualifying widow(er)," "$4000," "$0").

User interface 250 also includes an add field option 252 that, when user selected, presents a window that includes one or more other field names (associated with the determined document type) from which the user may select. If the user selects one of the presented field names, then a component of IDP system 130 retrieves the corresponding field value from the extracted text data items of the corresponding electronic document and causes the selected field name and the retrieved field value to be presented in user interface 250, which may be updated to only present those two data items or may be updated to present those two data items along with the field name-value pairs presented when add field option 252 was selected.

E. Warnings

In the depicted example, user interface 250 presents a warning 254 that indicates that IDP system 130 has low confidence in the extracted text, which, in this example, is a field name. (In other examples, the low confidence may be in a field value.) Such low confidence may be based on a mismatch in spatial information associated with the field name or in clarity of the image corresponding to the extracted field name.

Figure 2F:
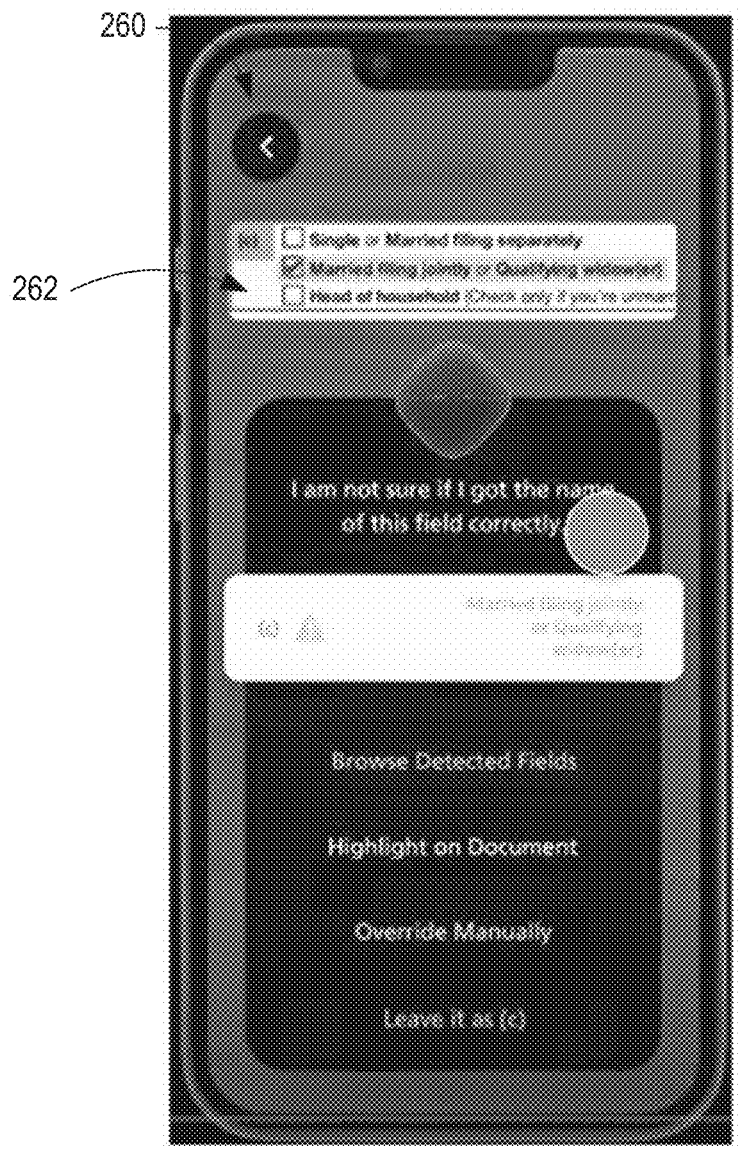
Figure 2G:
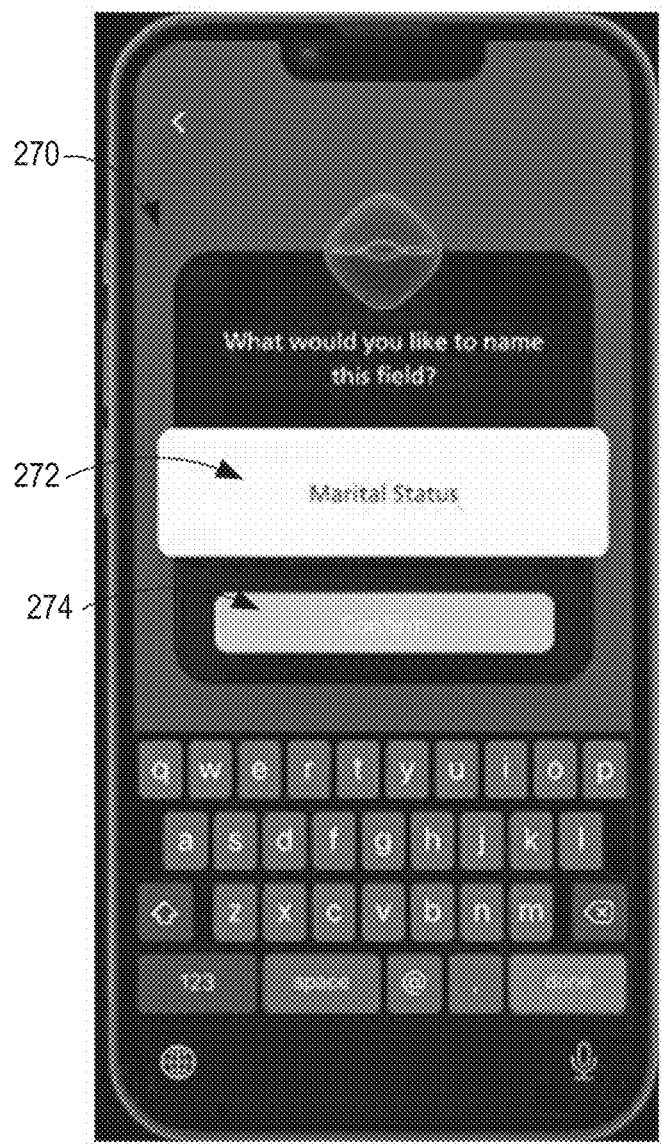
Figure 2H:
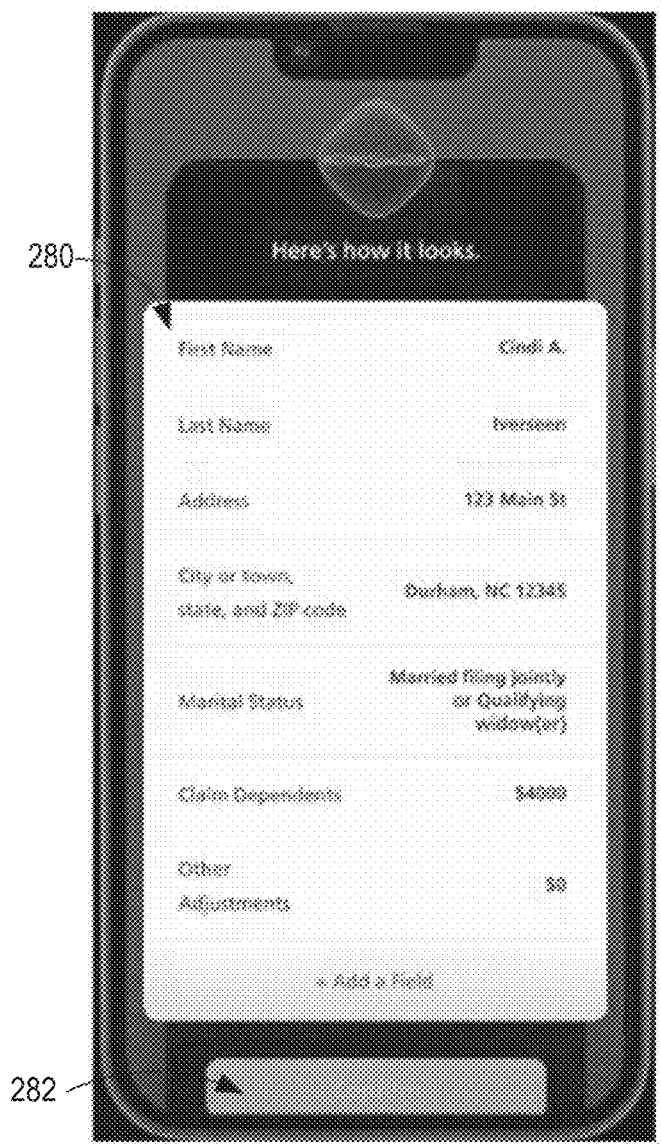
Figure 2I:
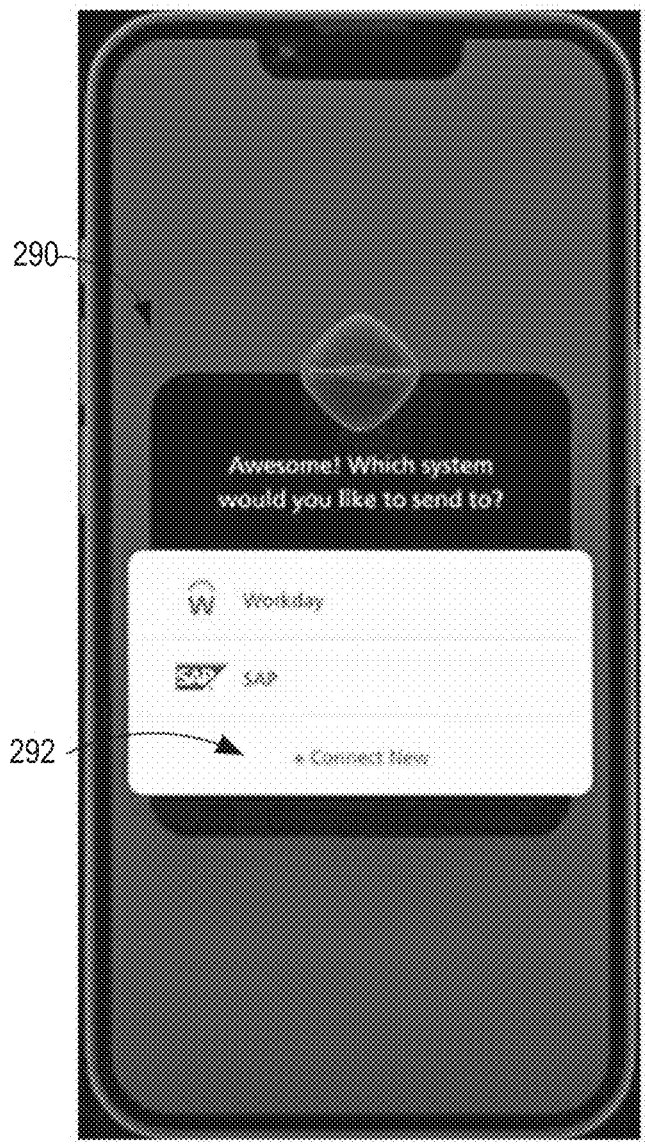

Selection of warning 254 causes an updated user interface to be displayed, or user interface 260 in FIG. 2F. In this example, user interface 260 includes a zoomed-in portion 262 of the electronic document, where zoomed-in portion 262 indicates the extracted text data items corresponding to the field name and field value in question. Here, the extracted field name is "(c)" and the extracted field value is "Married filing jointly or Qualifying widow(er)." Zoomed-in portion 262 also includes two other possible field values that someone filling out the document could have selected, namely "Single or Married filing separately" and "Head of household (Check only if you're unmarried)." These other possible field values may be shown because IDP system 130 has previously "learned" (e.g., based on user input) that these possible field values are associated with that extracted field name.

User interface 260 also includes user-selectable options, namely "Browse Detected Fields," "Highlight on Document," "Override Manually," and "Leave it is (c)." The first of these four options may be a default selection, but one of the other four options may be a default selection. Selection of the third option ("Override Manually") causes user interface 270 (in FIG. 2G) to be displayed on the screen of the computing device.

User interface 270 includes a text entry box 272 and a confirm button 274 that, when selected, causes any text entered into the text entry box 272 to be stored in place of the previous field name (i.e., "(c)"). In this example, the user of the computing device entered "Marital Status." Also, selection of confirm button 274 causes user interface 280 in FIG. 2H to be displayed on the screen of the computing device.

User interface 280 is similar to user interface 250. All the field names are the same except for the field name that was changed from "(c)" to "Marital Status." User interface 280 also includes a confirm button 282 that confirms the extracted text data items, their respective name-value associations, and the change. Selection of confirm button 282 causes user interface 290 in FIG. 2I to be displayed on the screen of the computing device.

F. Target Data Storage Service

Figure 2J:
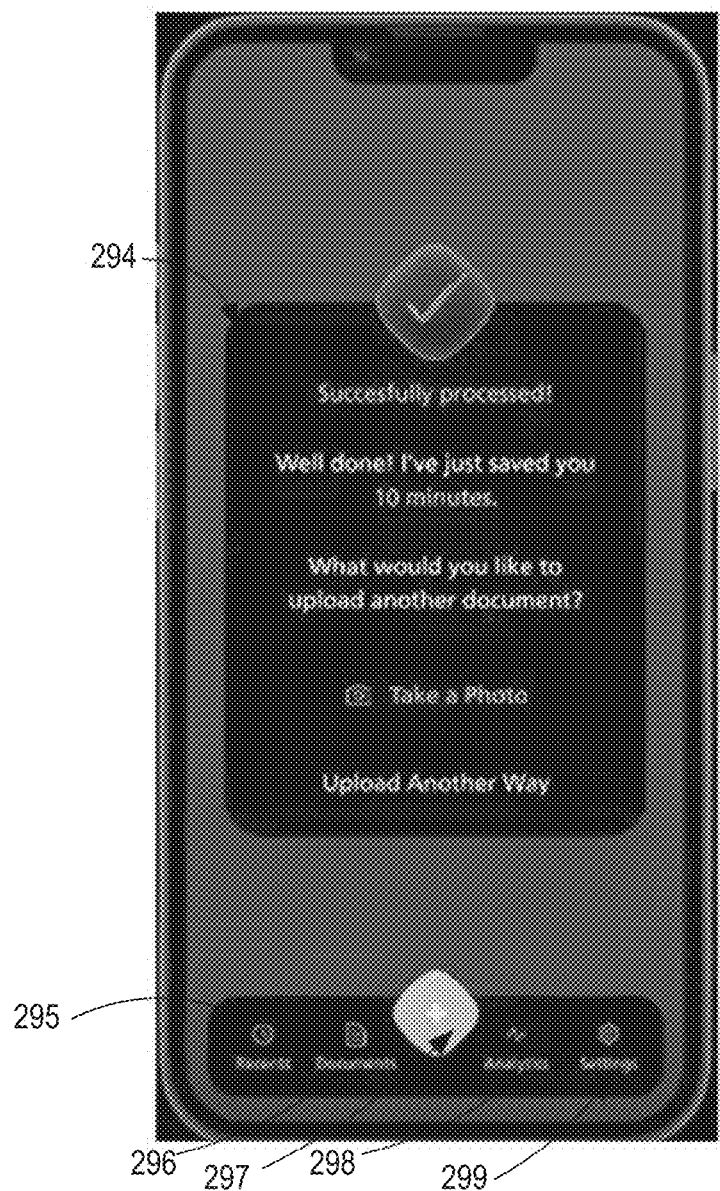

User interface 290 includes an indication of two target data storage services, which, in this example, include Workday and SAP. The target data storage services are external services to which ECC 146 of IDP system 130 can send extracted text data items (i.e., data set and data points), along with their respective associations. The target data storage services are services that the user (or the organization of to which the user belongs) relies on to store and manage extracted text data and allow the user to perform queries on that extracted text data. User interface 290 also includes a connect new button 292 that, when selected, allows the user to add connection settings for another target data storage service. In response to selection of one of the target data storage services, user interface 294 of FIG. 2J is displayed on the screen of the computing device. User interface 294 is described in more detail herein.

In an embodiment, an integration between IDP system 130 and a target data storage service has already been established where a field name is matched to a column name in a table of the user (or organization to which the user belongs). This integration may be established by the user, another representative of the organization, or a representative of the entity that owns or manages IDP system 130. In a related embodiment, the representative of the entity helps set up integration on behalf of the user or organization to which the user belongs.

In a related embodiment, IDP system 130 provides a tool to client devices 110-112 that allows users thereof to have different user interfaces, for different connectors (or different target data storage services), asking for different information to set up information for an integration between a client device and a target data storage service. For example, target data storage service 150 requires a first set of information to set up an integration between an organization and target data storage service 150, while target data storage service 152 requires a second set of information (that is different than the type of information in the first set) to set up an integration between the organization and target data storage service 152.

In a related embodiment, a default target data source is provided that is easy to set up, such as a shared Excel spreadsheet. The main information that is required to set up an integration between an organization and a shared document that stores extracted data (or "data points") is a URL of the shared document and a proper field name-column name mapping.

In an embodiment, each document type (e.g., listed in document type database 138) is associated with zero or more target data storage services. Thus, IDP system 130 may determine what target data storage services to present on user interface 290 based on this association. For example, IDP system 130 determines the document type of the received electronic document that has just been processed for data extraction, looks the document type in document type database 138, identifies any target data storage services associated with the document type, and presents the identified target data storage services on a user interface for the user, such as user interface 290.

In an embodiment, a user interface is provided to a user to add one or more target data storage services to an account of the user and/or an organization to which the user belongs. The user interface may also allow the user to assign a target data storage service to one or more document types. If a document type is not assigned a target data storage service, then any target data storage services that are associated with the user's account may be presented (as options) to the user after data extraction has occurred and the next step is transmit the extracted text (or data points and data set) to a target data storage system.

In an embodiment, an electronic document is associated with a sent status (e.g., in document database 142), the sent status indicating whether ECC 146 sent the extracted data to a target data storage service (e.g., target data storage service 150). Possible statuses include sent, not sent, and partial. A sent status may indicate that ECC 146 received, from target data storage service 150, a confirmation that service 150 received the extracted data and properly stored the extracted data without an issue, such as a field name-column name mismatch. As an example of a partial sent status, if some (but not all) the field names match corresponding column names in a target table maintained by target data storage service 150, then the corresponding data points or field values are stored in the target table, but the field values of field names that do not match a column name in the target table are not stored in the target table.

G. Document Data

The following are embodiments related to electronic documents and types of data that may be stored in association with each electronic document.

In an embodiment, document connector data is stored (e.g., in document database 142) that associates an electronic document with each target data storage service to which the electronic document was sent. Thus, some electronic documents may be sent to multiple target data storage services.

In an embodiment, each document is associated with a unique system-generated identifier (ID). This unique ID may be generated by IDP system 130. The unique ID may include or embed data that identifies the user, the organization to which the user belongs, the document type of the document, the date, and/or a counter that increases (e.g., monotonically). Thus, a unique ID for a document may be org1_DT3_2023-02-28_3, indicating that this is the third document, of document type DT3, that a user from organization org1 has initiated for data extraction on the date of Feb. 28, 2023.

In an embodiment, each document is associated with user origination data (e.g., stored in document database 142) that associates a document with an identity of user that initiated data extraction of the document, such as a first name and last name or an organization-provided user number. The user origination data may also include date information that indicates when the corresponding document was processed for data extraction.

In an embodiment, document database 142 includes, for each document, a file of the image corresponding to the electronic document. As described in more detail herein, because some files may include multiple documents, the same file may be associated with multiple documents in document database 142. Efficiencies may be achieved by storing a single copy of such a file while each record corresponding to a document (of the multiple documents) stores a reference to that copy.

In an embodiment, each document is associated with access privileges that define who can access documents and what type of actions can be performed relative to the documents. Additionally or alternatively, each user of an organization may be associated with certain privileges that define what actions the user may perform relative to any document, a group of documents, or particular documents, such as reading the document/group of documents, modifying the document/group of documents (e.g., modifying the data set and/or data points), and deleting the document/group of documents.

H. Process Completion

User interface 294 includes data that indicates: (1) that the electronic document was successfully processed (implying that the extracted text data items have been transmitted to the target data storage service); (2) an amount of time savings; and (3) two options to upload another document for data extraction and storage (i.e., taking a photo or uploading another way). Thus, IDP system 130, in conjunction with the application executing on the computing device provides end-to-end integration, requiring minimal user input to extract, confirm, and transmit extracted text to a target data storage service. Prior to this approach, a user would have to interact with the target data storage service directly and manually enter the field values.

User interface 294 also includes five options: (1) a recents option 295 to view one or more recent extractions of electronic documents; (2) a documents option 296 to view one or more electronic documents that have not yet been processed for data extraction; (3) a plus option 297 to begin a data extraction process for another electronic document; (4) an analytics option 298 to view analytics pertaining to electronic documents that have been processed for data extraction, and a (5) a settings option 299 to adjust settings for data extraction or for a target data storage service.

Selection of recents option 295 causes data about zero or more recent extractions of electronic documents. These electronic documents may be limited to the electronic documents (i) that the user (who is currently operating the computing device) has scanned or uploaded (to IDP system 130) for data extraction, (ii) that multiple users of an organization (to which the user belongs or is associated) have scanned or uploaded for data extraction, or (iii) that members of a certain group of the organization have scanned or uploaded for data extraction. Depending on access privileges of the user, the user may be presented with additional options to view one or more of these three sets of electronic documents.

Selection of documents option 296 causes data about zero or more electronic documents that have not yet been processed for data extraction. Similar to scenario with recents option 295, these electronic documents may be limited to the electronic documents (i) that the user (who is currently operating the computing device) has already scanned or uploaded (to IDP system 130) for data extraction, (ii) that multiple users of an organization (to which the user belongs or is associated) have scanned or uploaded for data extraction, or (iii) that members of a certain group of the organization have scanned or uploaded for data extraction. Depending on access privileges of the user, the user may be presented with additional options to view one or more of these three sets of electronic documents.

Selection of plus option 297 causes options to be presented that allow the user to begin the data extraction process for another electronic document. The options may be taking a picture with a camera of the computing device or selecting a file that is stored on the computing device or that is stored in a storage system that is separate from the computing device, such as a storage location in a cloud service.

Selection of analytics option 298 causes analytics data to be presented pertaining to electronic documents that have been processed for data extraction. Analytics data may include a number of electronic documents for which the user has initiated data extraction, a number of electronic documents for which the user's group within an organization has initiated data extraction, a number of electronic documents for which all members of the organization have initiated data extraction, an average time saved per document extraction by using IDP system 130, to which target data storage services documents were transmitted, the methods of capturing images, types of documents captured (and associated volume), top users/departments within an organization, total time saved during a particular time period, field name adjustments made by artificial intelligence based on past user actions, percentage of images that were "clean." i.e., required no change and were extracted perfectly, and document types that required the most field changes.

Selection of settings option 299 causes settings to be presented pertaining to data extraction and/or a target data storage service. Example settings pertaining to data extraction include changing one or more field names of a document type. Example settings pertaining to a target data storage service include user credentials (e.g., a username and password), an IP address of the service, a name of a target table, and a field-to-column mapping

V. User-Assisted Extraction

Figure 3A:
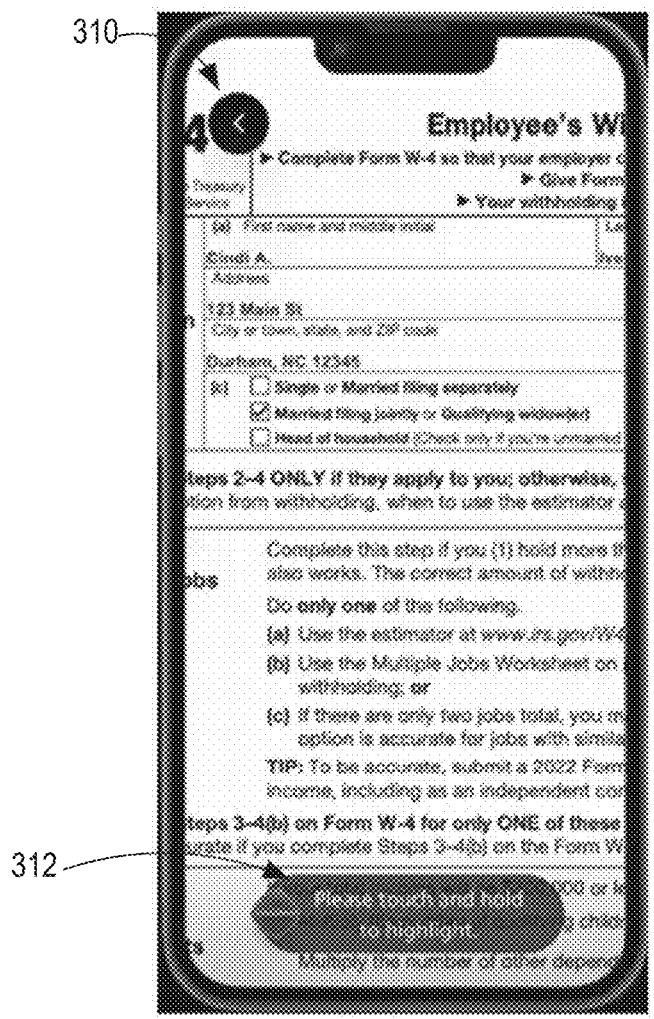
Figure 3B:
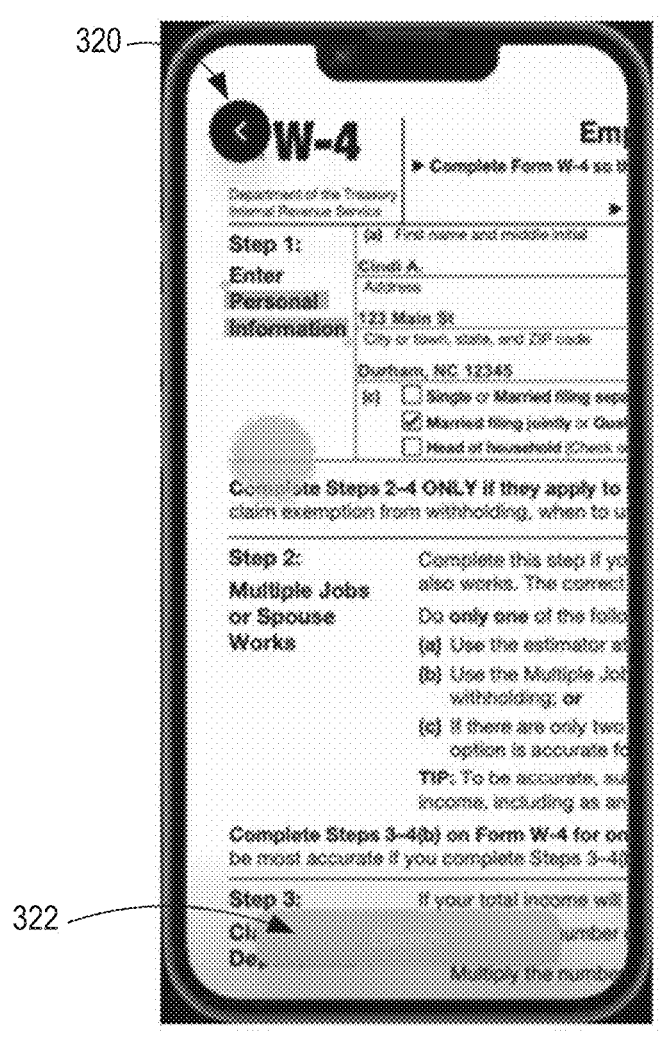
Figure 3C:
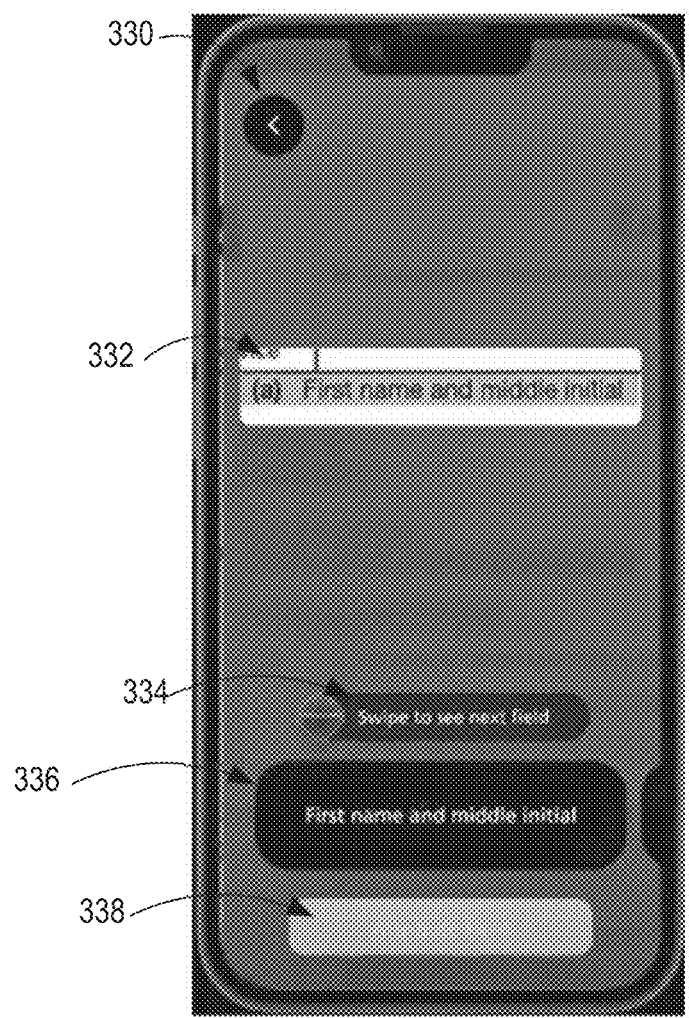

FIG. 3A is a user interface 310 that allows a user to select a field name from an electronic document, in an embodiment. User interface 310 does not necessarily succeed user interface 294, but may be used when training (or establishing extraction rules) for a new document type or updating the extraction rules for an existing document type. User interface 310 presents a zoomed-in portion of an electronic document. Although not depicted, user interface 310 may include controls for zooming in and out of the presented electronic document. Also, finger movements on the screen of the computing device may cause the view of the electronic document to similarly move.

User interface 310 includes an instruction 312 that invites the user to touch and hold a portion of the electronic document in which the user is interested in order to highlight certain text. Once the user touches a portion for a period of time (e.g., 1.5 seconds), the text at that portion is automatically highlighted.

User interface 320 (of FIG. 3B) presents a view of an electronic document after the user has provided input to alter the view of the electronic document from FIG. 3A and touched and held a portion of the electronic document. The text "Personal Information" is highlighted because it is the portion of screen (of the computing device) that the user touched and held. Once the text corresponding to that portion is highlighted, instruction 312 may be replaced with a confirm button 322.

User interfaces 310-320 depict one way a user of client device 110 may identify field names in an electronic document for the purposes of creating/defining a new document type or updating an existing document type. User interface 330 (of FIG. 3C) depicts another way a user of client device may confirm field names of an electronic document for the same purpose. However, with user interface 330, IDP system 130 (or software executing on client device 110) automatically identifies candidate field names for the user of client device 110 to confirm.

User interface 330 presents a zoomed-in portion 332 of an electronic document, where zoomed-in portion 332 shows just a single detected field name. User interface 330 also includes a swipe button 334 that, when selected, causes another zoomed-in portion of the electronic document to be presented, corresponding to another detected field name. User interface 330 also includes text area 336 that shows the extracted text of the field name. User interface 330 also includes an attribute field button 338 that, when selected, may confirm that the extracted text matches the field name in zoomed-in portion 332 and cause the display to be updated to show the corresponding field values for first name and middle initial, such as "John B."

The set of user interfaces 310-330 are particularly useful in situations where forms are relatively simple in terms of few field names to detect and corresponding field values to extract. Even with relatively complex forms, a user or the associated organization might not be interested in all the fields; rather, only a relatively small subset of the fields in the form may be needed by the organization. For a new document type, embodiments reflected in FIGS. 3A-3C do not overwhelm the user with many buttons, drop down menus, etc. Instead, the user interfaces guide the user one field at a time.

The process of a user manually identifying field names and values (or at least selecting options that are automatically extracted and presented to the user) for a document whose document type is new or not known to IDP system 130 (or at least not known to the organization) is referred to as "training" IDP system 130 for the document type.

Even with embodiments described herein for a streamlined training process for a new document type, in an embodiment, a training assistance option is presented when a new document type is detected. User selection of the training assistance option causes the electronic document (which triggered detection of the new document type) to be transmitted to a representative of the entity that owns or manages IDP system 130. The representative may be a third-party relative to that entity. The representative provides the inputs to train IDP system 130 with respect to the new document type. The representative may also set up rules for integration with, and delivery to, a third-party data storage service. These rules may be document type-specific rules. Then, with the training and these rules established, when IDP system 130 receives an electronic document of a specific document type, IDP system 130 is able to extract the appropriate field values, match them to corresponding field names, and leverage the appropriate rules to transmit the name-value pairs to the proper target data storage service.

VI. Example Process

Figure 4:
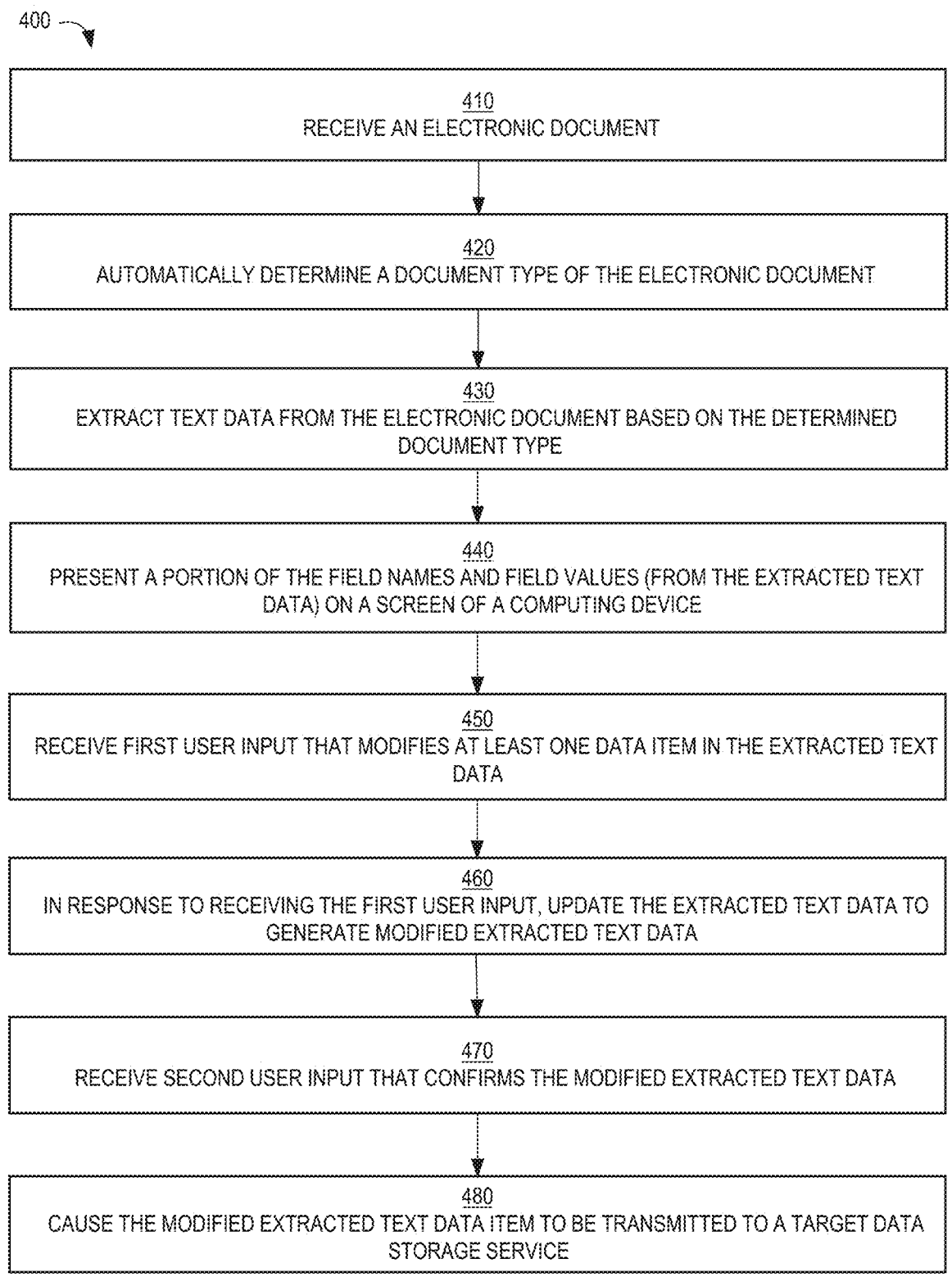
FIG. 4 is a flow diagram that depicts an example process for processing an electronic document, in an embodiment.

FIG. 4 is a flow diagram that depicts an example process 400 for processing an electronic document, in an embodiment. Process 400 may be performed by a computing device (e.g., client device 110) and one or more components of IDP system 130.

At block 410, an electronic document is received. Block 410 may involve receiving component 132 receiving an image from client device 110 over computer network 120 and OCR component 134 performing an OCR operation on the image, generating the electronic document. Alternatively, block 410 may involve an application (executing on client device 110) receiving the electronic document as output from an OCR operation performed on client device 110, where an image generated from a camera integrated in client device 110 is input to the OCR operation.

At block 420, a document type of the electronic document is determined automatically. Block 420 may involve DTDC 136 analyzing content of the electronic document in order to make this determination.

At block 430, text data is extracted from the electronic document based on the determined document type. The text data comprises multiple field values that correspond to multiple field names that are associated with the determined document type.

At block 440, a portion of the field names and the field values are presented on a screen of client device 110. Block 440 may involve ECC 146 or receiving component 132 sending this portion over computer network 120 to client device 110.

At block 450, first user input that modifies at least one data item in the extracted text data is received. Block 450 may involve client device 110 receiving, through a graphical user interface, one or more selections of graphical elements that cause the data item to be selected and modified. Alternatively, block 450 may involve receiving, from client device 110, at receiving component 132, user interface selections that indicate a modification to the at least one data item.

At block 460, in response to receiving the first user input, the extracted text data is updated to generate modified extracted text data. Again, block 460 may be performed on client device 110 or by IDP system 130.

At block 470, second user input that confirms the modified extracted text data is received. Again, block 470 may involve client device 110 receiving, through a graphical user interface, one or more selections of graphical elements that indicate confirmation of the modified data item (and, optionally, other text data items). Alternatively, block 470 may involve receiving, from client device 110, at receiving component 132, one or more user interface selections that indicate the confirmation.

At block 480, the modified extracted text data is transmitted over computer network 120 to target data storage service 150 (or 152). Block 480 may involve ECC 146 performing this block. Alternatively, block 480 may involve client device 110 communicating the modified extracted text data (and, optionally, the other (non-modified) extracted text data) over computer network 120 to target data storage service 150 without going through IDP system 130.

VII. Implementation Mechanisms

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
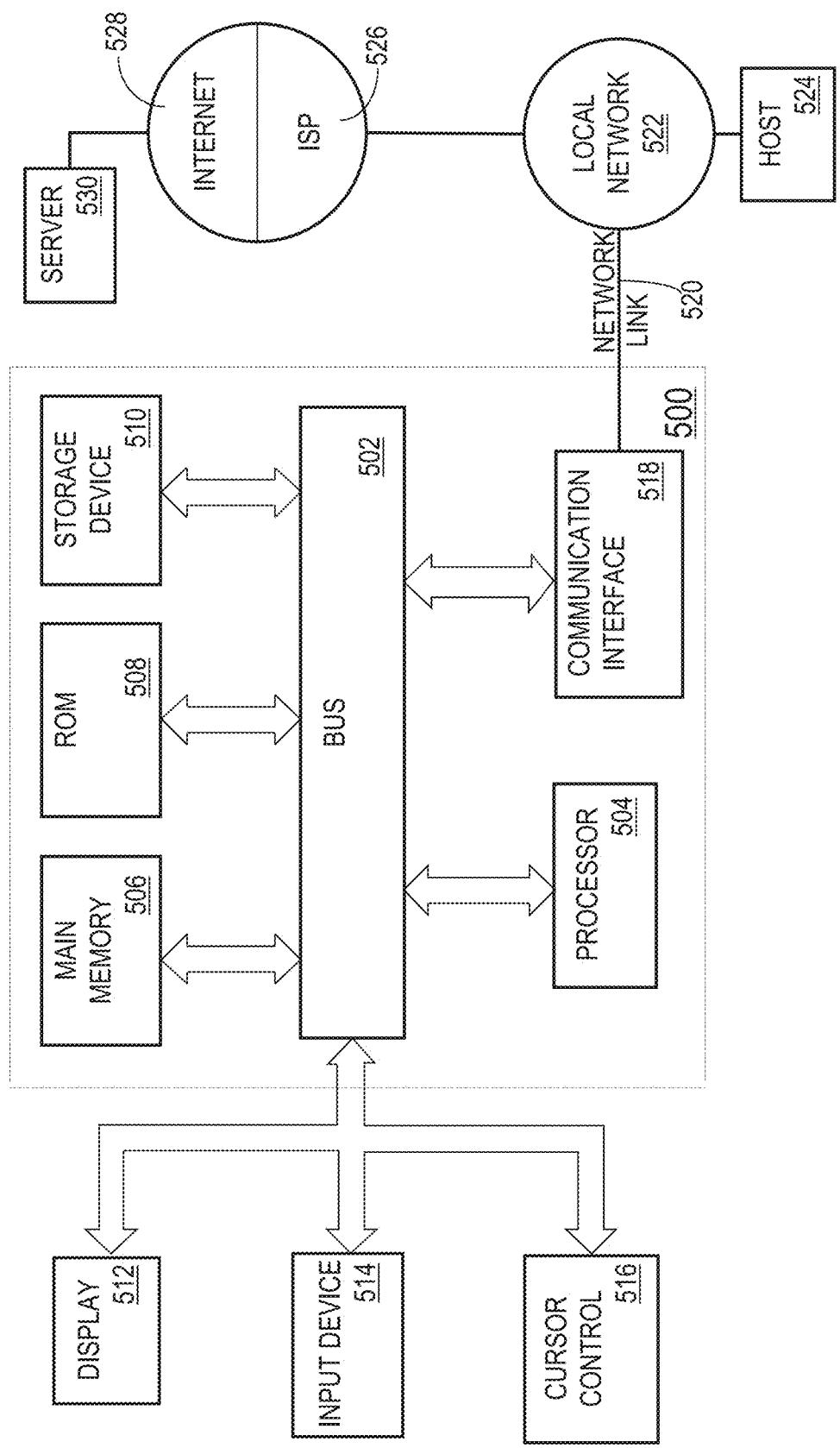
FIG. 5 is a block diagram that depicts an example computer system upon which embodiments of the invention may be implemented.

FIG. 5 is a block diagram that depicts an example computer system 500 upon which embodiments of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. Although bus 502 is illustrated as a single bus, bus 502 may comprise one or more buses. For example, bus 502 may include without limitation a control bus by which processor 504 controls other devices within computer system 500, an address bus by which processor 504 specifies memory locations of instructions for execution, or any other type of bus for transferring data or signals between components of computer system 500.

An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic or computer software which, in combination with the computer system, causes or programs computer system 500 to be a special-purpose machine. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operate in a specific manner. In an embodiment implemented using computer system 500, various computer-readable media are involved, for example, in providing instructions to processor 504 for execution. Such a medium may take many forms, including but not limited to, non-volatile media and volatile media. Non-volatile media includes, for example, optical or magnetic disks, such as storage device 510. Volatile media includes dynamic memory, such as main memory 506. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
   one or more processors;
   one or more storage media storing instructions which, when executed by the one or more processors, cause:
   receiving an electronic document;
   automatically analyzing content of the electronic document to determine a particular document type of the electronic document from among a plurality of document types;
   based on the particular document type, extracting text data from the electronic document, wherein the text data comprises a plurality of field values that correspond to a plurality of field names that are associated with the particular document type;
   generating a particular confidence score for a particular text item in the text data;
   causing a warning, that is associated with particular text item based on the particular confidence score, and at least a portion of the plurality of field names and the plurality of field values to be presented on a screen of a computing device, wherein the plurality of field names and the plurality of field values includes the particular text item;

receiving, through the computing device, first user input that selects the warning;

in response to receiving the first user input, updating the screen to present a plurality of options;

receiving, through the computing device, second user input that selects one of the plurality of options.

2. The apparatus of claim 1, wherein the instructions, when executed by the one or more processors, further cause:

receiving, through the computing device, third user input that modifies at least one data item in the text data that was extracted from the electronic document;

in response to receiving the third user input, updating the text data to generate modified text data;

receiving, through the computing device, fourth input that causes a view of the electronic document, on the screen of the computing device, to increase a first zoom level of the view to a second zoom level that is higher than the first zoom level;

wherein receiving the third user input is performed while the view of the electronic document is at the second zoom level.

3. The apparatus of claim 1, wherein:

the instructions, when executed by the one or more processors, further cause;

receiving, through the computing device, third user input that modifies at least one data item in the text data that was extracted from the electronic document;

wherein the third user input includes a new field name for a particular field name of the plurality of field names;

in response to receiving the third user input, updating the text data to generate modified text data;

updating, based on the third user input, data associated with the particular field name.

4. The apparatus of claim 3, wherein:

the particular document type is associated with document type data that identifies the plurality of field names;

updating the data comprises updating the document type data to replace the particular field name with the new field name.

5. The apparatus of claim 1, wherein the electronic document is a second electronic document that is different than a first electronic document, wherein the text data is a second text data, wherein the instructions, when executed by the one or more processors, further cause, prior to receiving the second electronic document:

receiving the first electronic document, wherein prior to receiving the first electronic document the plurality of document types did not include the particular document type;

while automatically analyzing the first electronic document, extracting first text data from the first electronic document, wherein the first text data comprises one or more field names;

receiving third user input that confirms that the first electronic document is of a new document type, wherein the particular document type is the new document type;

adding the new document type to the plurality of document types;

generating and storing an association between the one or more field names and the new document type.

6. The apparatus of claim 5, wherein:

the computing device is a second computing device that is different than a first computing device;

the first electronic document is received from the first computing device and the second electronic document is received from the second computing device;

the instructions, when executed by one or more processors, further cause:

storing organization data that associates a first user of the first computing device with a second user of the second computing device;

storing document type data that associates the plurality of document types with the organization data;

in response to receiving the second electronic document and based on the second computing device being associated with the plurality of document types through the organization data and the document type data, selecting the plurality of document types from which to analyze the second electronic document.

7. The apparatus of claim 5, wherein the instructions, when executed by the one or more processors, further cause:

automatically identifying a first field name in the first electronic document;

causing the first field name to be presented on a first screen of a first computing device;

receiving, through the first computing device, fourth user input that confirms the first field name;

causing the first field name to be stored in association with the new document type;

automatically identifying a second field name in the first electronic document;

after receiving the fourth user input, causing the second field name to be presented on the first screen of the first computing device;

receiving, through the first computing device, fifth user input that confirms the second field name;

causing the second field name to be stored in association with the new document type.

8. The apparatus of claim 1, wherein the instructions, when executed by the one or more processors, further cause:

storing organization data that identifies a first organization and a second organization that is different than the first organization;

wherein input from one or more members of the first organization caused creation of the particular document type;

wherein the electronic document is received from a member of the second organization;

storing document type sharing data that allows the particular document type to be used for the members of the second organization;

wherein determining the particular document type is based on the document type sharing data.

9. The apparatus of claim 1, wherein the instructions, when executed by the one or more processors, further cause:

receiving, through the computing device, third user input that modifies at least one data item in the text data that was extracted from the electronic document;

in response to receiving the third user input, updating the text data to generate modified text data;

receiving, through the computing device, fourth user input that confirms the modified text data:

causing the modified text data to be transmitted over a computer network to a target data storage service;

after receiving the fourth input and prior to causing the modified text data to be transmitted to the target data storage service:
  causing a plurality of target data storage services to be presented on the screen of the computing device;
  receiving, through the computing device, fifth user input that selects the target data storage service from among the plurality of target data storage services.

10. The apparatus of claim 1, wherein the instructions, when executed by the one or more processors, further cause:
  receiving, through the computing device, third user input that modifies at least one data item in the text data that was extracted from the electronic document;
  in response to receiving the third user input, updating the text data to generate modified text data;
  wherein the third user input is a change to one of the plurality of field values.

11. The apparatus of claim 1, wherein receiving the electronic document comprises receiving the electronic document from the computing device over one or more computer networks.

12. The apparatus of claim 1, wherein:
  the instructions, when executed by the one or more processors, further cause:
    receiving a second electronic document from a second computing device; automatically analyzing the second electronic document to detect multiple document types within the second electronic document;
    after detecting the multiple document types, causing a plurality of options to be presented on a second screen of the second computing device;
  the plurality of options includes a first option and a second option;
  the first option is to process the second electronic documents based on the multiple document types that were detected;
  the second option is to allow a user of the second computing device to review the multiple document types before processing the electronic documents based on the multiple document types.

13. The apparatus of claim 1, wherein the instructions, when executed by the one or more processors, further cause:
  receiving, through the computing device, third user input that modifies at least one data item in the text data that was extracted from the electronic document;
  in response to receiving the third user input, updating the text data to generate modified text data;
  receiving, through the computing device, fourth user input that confirms the modified text data;
  causing the modified text data to be transmitted over a computer network to a target data storage service;
  after the modified text data is transmitted over the computer network to the target data storage service, causing a user interface to be presented on the screen of the computing device;
  wherein the user interface includes two or more of:
    a first option to view one or more recent scans of electronic documents,
    a second option to view one or more electronic documents that have not yet been processed for data extraction,
    a third option to begin a data extraction process for another electronic document;
    a fourth option to view analytics pertaining to electronic documents that have been processed for data extraction, or
    a fifth option to adjust settings for data extraction or data storage.

14. One or more storage media storing instructions which, when executed by one or more processors, cause:
  receiving an electronic document;
  automatically analyzing content of the electronic document to determine a particular document type of the electronic document from among a plurality of document types;
  based on the particular document type, extracting text data from the electronic document, wherein the text data comprises a plurality of field values that correspond to a plurality of field names that are associated with the particular document type;
  generating a particular confidence score for a particular text item in the text data;
  causing a warning, that is associated with the particular text item based on the particular confidence score, and at least a portion of the plurality of field names and the plurality of field values to be presented on a screen of a computing device, wherein the plurality of field names and the plurality of field values includes the particular text item;
  receiving, through the computing device, first user input that selects the warning;
  in response to receiving the first user input, updating the screen to present a plurality of options;
  receiving, through the computing device, second user input that selects one of the plurality of options.

15. The one or more storage media of claim 14, wherein:
  the instructions, when executed by the one or more processors, further cause;
    receiving, through the computing device, third user input that modifies at least one data item in the text data that was extracted from the electronic document;
    wherein the third user input includes a new field name for a particular field name of the plurality of field names;
    in response to receiving the third user input, updating the text data to generate modified text data;
    updating, based on the third user input, data associated with the particular field name.

16. The one or more storage media of claim 14, wherein the electronic document is a second electronic document that is different than a first electronic document, wherein the text data is a second text data, wherein the instructions, when executed by the one or more processors, further cause, prior to receiving the second electronic document:
  receiving the first electronic document, wherein prior to receiving the first electronic document the plurality of document types did not include the particular document type;
  while automatically analyzing the first electronic document, extracting first text data from the first electronic document, wherein the first text data comprises one or more field names;
  receiving third user input that confirms that the first electronic document is of a new document type, wherein the particular document type is the new document type;
  adding the new document type to the plurality of document types;
  generating and storing an association between the one or more field names and the new document type.

17. The one or more storage media of claim 14, wherein the instructions, when executed by the one or more processors, further cause:
- storing organization data that identifies a first organization and a second organization that is different than the first organization;
- wherein input from one or more members of the first organization caused creation of the particular document type;
- wherein the electronic document is received from a member of the second organization;
- storing document type sharing data that allows the particular document type to be used for the members of the second organization;
- wherein determining the particular document type is based on the document type sharing data.

18. The one or more storage media of claim 14, wherein the instructions, when executed by the one or more processors, further cause:
- receiving, through the computing device, third user input that modifies at least one data item in the text data that was extracted from the electronic document;
- in response to receiving the third user input, updating the text data to generate modified text data;
- receiving, through the computing device, fourth user input that confirms the modified text data;
- causing the modified text data to be transmitted over a computer network to a target data storage service;
- after receiving the fourth input and prior to causing the modified text data to be transmitted to the target data storage service:
  - causing a plurality of target data storage services to be presented on the screen of the computing device;
  - receiving, through the computing device, fifth user input that selects the target data storage service from among the plurality of target data storage services.

19. The one or more storage media of claim 14, wherein:
the instructions, when executed by the one or more processors, further cause:
- receiving a second electronic document from a second computing device;
- automatically analyzing the second electronic document to detect multiple document types within the second electronic document;
- after detecting the multiple document types, causing a plurality of options to be presented on a second screen of the second computing device;

the plurality of options includes a first option and a second option;

the first option is to process the second electronic documents based on the multiple document types that were detected;

the second option is to allow a user of the second computing device to review the multiple document types before processing the electronic documents based on the multiple document types.

20. The apparatus of claim 1, wherein the plurality of options comprise one or more of:
- a first option to browse the plurality of field names;
- a second option to highlight the particular text item on the electronic document;
- a third option to allow manually naming of the particular text item; or
- a fourth option to leave the particular text item as is.

* * * * *